US011733038B2

(12) United States Patent
Nagarajan et al.

(10) Patent No.: US 11,733,038 B2
(45) Date of Patent: *Aug. 22, 2023

(54) FLOOR HEIGHT ESTIMATION AND CALIBRATION OF A MOBILE DEVICE

(71) Applicant: NextNav, LLC, Sunnyvale, CA (US)

(72) Inventors: Badrinath Nagarajan, South San Francisco, CA (US); Arun Raghupathy, Ramagondanahalli (IN); Michael Dormody, San Jose, CA (US); Guiyuan Han, San Jose, CA (US)

(73) Assignee: NextNav, LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,810

(22) Filed: Jan. 3, 2022

(65) Prior Publication Data
US 2022/0128355 A1 Apr. 28, 2022

Related U.S. Application Data

(63) Continuation of application No. 17/247,011, filed on Nov. 24, 2020, now Pat. No. 11,215,453.

(60) Provisional application No. 62/940,934, filed on Nov. 27, 2019.

(51) Int. Cl.
G01C 5/06 (2006.01)
G01C 25/00 (2006.01)
H04W 4/33 (2018.01)
H04W 4/021 (2018.01)

(52) U.S. Cl.
CPC ............. G01C 5/06 (2013.01); G01C 25/00 (2013.01); H04W 4/021 (2013.01); H04W 4/33 (2018.02)

(58) Field of Classification Search
CPC .......... G01C 5/06; G01C 25/00; H04W 4/33; H04W 4/021
USPC ..... 73/384, 1.57, 1.59, 37, 178 R, 181, 182, 73/714
See application file for complete search history.

(56) References Cited

U.S. PATENT DOCUMENTS 9,980,246 B2 5/2018 Pattabiraman et al.
11,215,453 B2 * 1/2022 Nagarajan .............. G01C 25/00
2012/0290253 A1 11/2012 Barrett et al.
(Continued)

FOREIGN PATENT DOCUMENTS

EP 3264035 A1 1/2018
JP 2013002933 A 1/2013
(Continued)

OTHER PUBLICATIONS

International Search Report dated Feb. 26, 2021 for PCT Patent Application No. PCT/IB2020/061098.
(Continued)

Primary Examiner — Robert R Raevis
(74) Attorney, Agent, or Firm — MLO, a professional corp.

(57) ABSTRACT

Methods and machines involve detecting when a mobile device is in a first area and a second area at different times, collecting pressure data from the mobile device and reference sensor(s) to estimate altitudes of the mobile device within the first area and the second area, collecting terrain altitudes associated with the first area and the second area, and using a difference between the estimated altitudes and a difference between the terrain altitudes to determine a height of a floor. The estimated floor height may be used to calibrate a pressure sensor of a mobile device.

20 Claims, 5 Drawing Sheets

(56) References Cited

U.S. PATENT DOCUMENTS

| | | |
|---|---|---|
| 2013/0332106 A1 | 12/2013 | Karvounis et al. |
| 2016/0102995 A1 | 4/2016 | Gum et al. |
| 2016/0161252 A1 | 6/2016 | Yasui |
| 2016/0169670 A1 | 6/2016 | Karvounis et al. |
| 2016/0337813 A1 | 11/2016 | Venkatraman et al. |
| 2017/0363423 A1 | 12/2017 | Dormody et al. |
| 2018/0255431 A1 | 9/2018 | Robertson et al. |
| 2019/0371054 A1 | 12/2019 | Young et al. |

FOREIGN PATENT DOCUMENTS

| | | |
|---|---|---|
| JP | 6188077 B2 | 8/2017 |
| KR | 1020130136755 A | 12/2013 |
| KR | 1020190045915 A | 5/2019 |

OTHER PUBLICATIONS

Notice of Allowance and Fees dated Sep. 3, 2021 for U.S. Appl. No. 17/247,011.
Office Action dated Jun. 3, 2021 for U.S. Appl. No. 17/247,011.
European Search Report dated Apr. 18, 2023 for European Patent Office Patent Application No. 20893674.0.

* cited by examiner

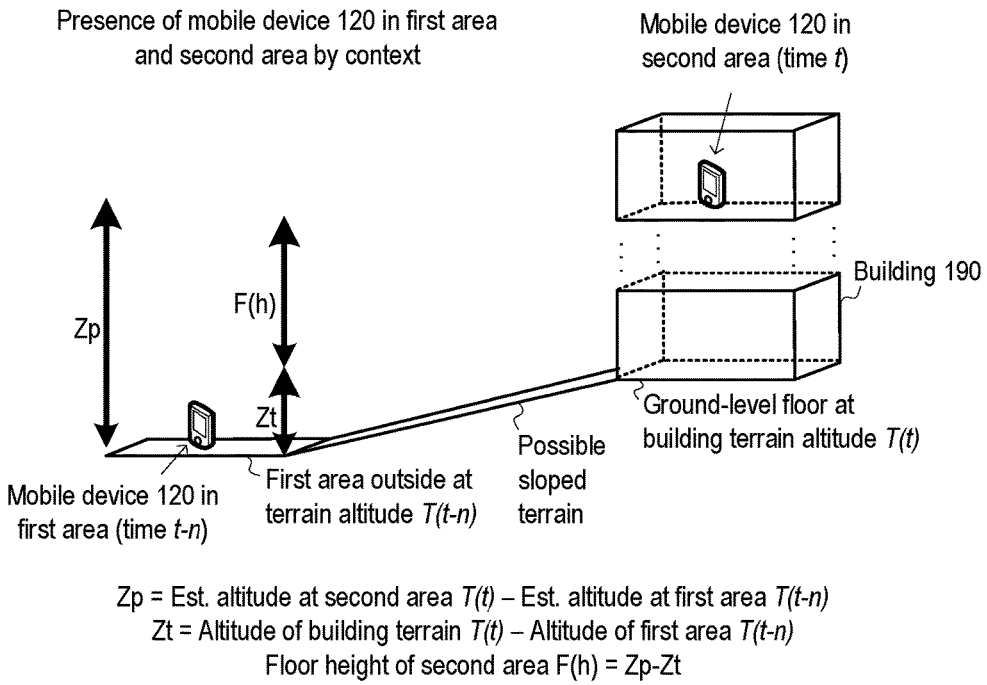
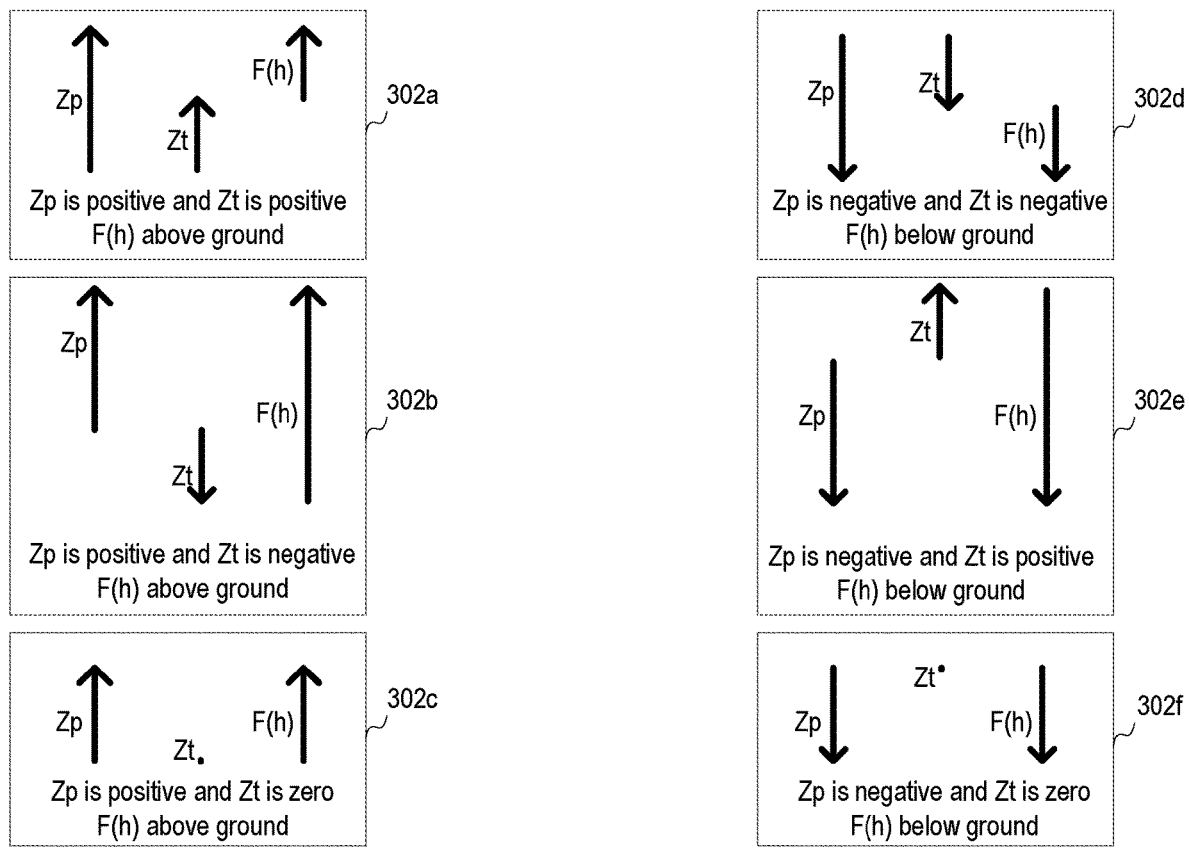
FIG. 3

DAY 1

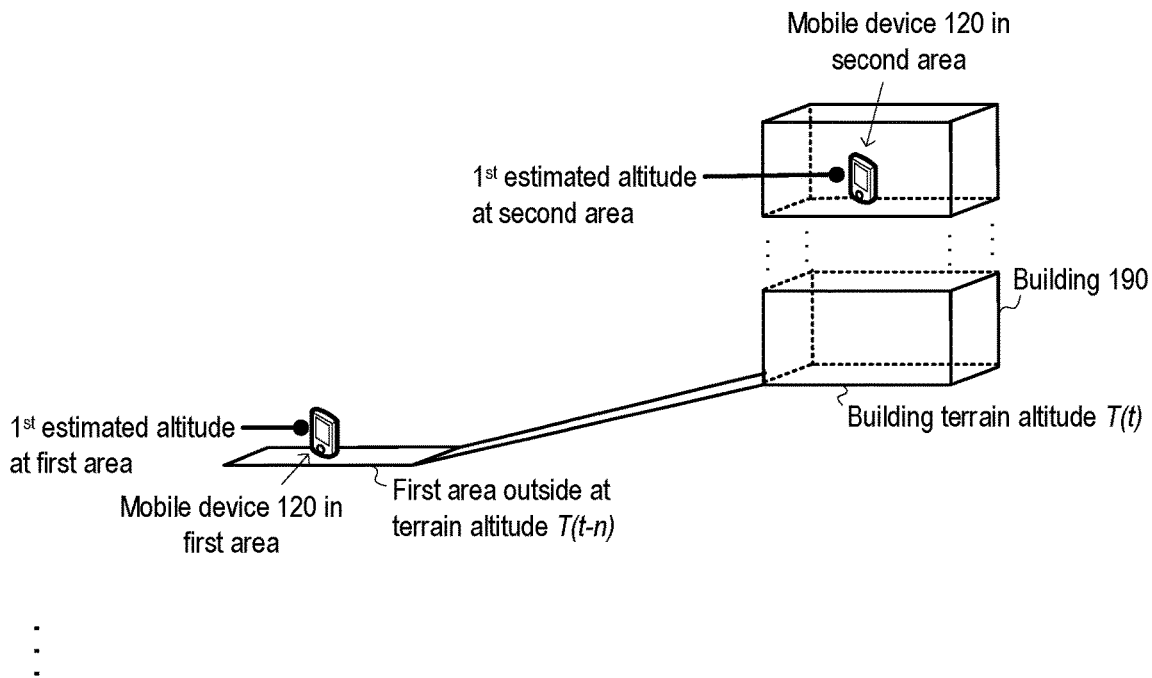

⋮

DAY N

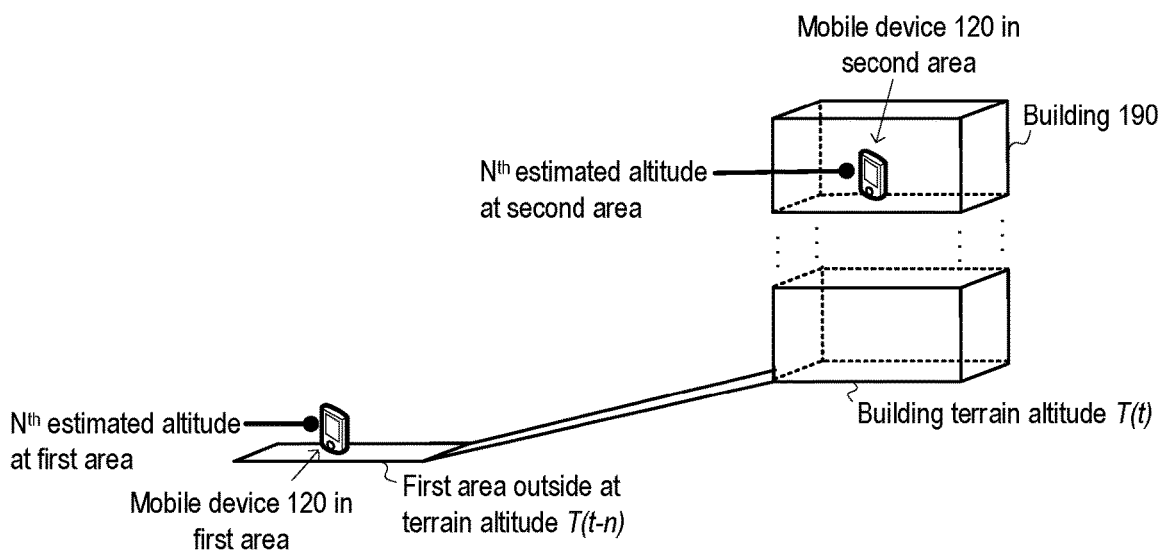

Combine 1st through Nth estimated altitudes at first area to determine Estimated Altitude at First Area
Combine 1st through Nth estimated altitudes at second area to determine Estimated Altitude at Second Area
$Z_p$ = Estimated Altitude at Second Area – Estimated Altitude at First Area
$Z_t$ = Altitude of building terrain $T(t)$ – Altitude of first area $T(t)$
Floor height of second area $F(h) = Z_p - Z_t$

FIG. 4

FLOOR HEIGHT ESTIMATION AND CALIBRATION OF A MOBILE DEVICE

RELATED APPLICATIONS

This application is a continuation of U.S. patent application Ser. No. 17/247,011, filed Nov. 24, 2020, which claims the benefit of U.S. Provisional Patent Application No. 62/940,934, filed on Nov. 27, 2019, and entitled "Floor Height Estimation and Calibration of a Mobile Device", all of which are hereby incorporated by reference in their entirety for all purposes.

BACKGROUND

Determining the exact location of a mobile device (e.g., a smart phone operated by a user) in an environment can be quite challenging, especially when the mobile device is located in an urban environment or is located within a building. Imprecise estimates of the mobile device's altitude, for example, may have life or death consequences for the user of the mobile device since the imprecise altitude estimate can delay emergency personnel response times as they search for the user on multiple floors of a building. In less dire situations, imprecise altitude estimates can lead a user to the wrong area in an environment.

Different approaches exist for estimating an altitude of a mobile device. In a barometric-based positioning system, altitude can be determined using a measurement of pressure from a calibrated pressure sensor of a mobile device along with ambient pressure measurement(s) from a network of calibrated reference pressure sensors and a measurement of ambient temperature from the network or other source. An estimate of an altitude of a mobile device ($h_{mobile}$) can be determined by the mobile device, a server, or another machine that receives needed information as follows:

$$h_{mobile} = h_{sensor} - \frac{RT_{remote}}{gM} \ln\left(\frac{P_{sensor}}{P_{mobile}}\right), \quad \text{(Equation 1)}$$

where $P_{mobile}$ is the estimate of pressure at the location of the mobile device by a pressure sensor of the mobile device, $P_{sensor}$ is an estimate of pressure at the location of a reference pressure sensor that is accurate to within a tolerated amount of pressure from true pressure (e.g., less than 5 Pa), $T_{remote}$ is an estimate of temperature (e.g., in Kelvin) at the location of the reference pressure sensor or a different location of a remote temperature sensor, $h_{sensor}$ is an estimated altitude of the reference pressure sensor that is estimated to within a desired amount of altitude error (e.g., less than 1.0 meters), g corresponds to the acceleration due to gravity (e.g., −9.8 m/s²), R is a gas constant, and M is molar mass of air (e.g., dry air or other). The minus sign (−) may be substituted with a plus sign (+) in alternative embodiments of Equation 1, as would be understood by one of ordinary skill in the art (e.g., g=9.8 m/s²). The estimate of pressure at the location of the reference pressure sensor can be converted to an estimated reference-level pressure that corresponds to the reference pressure sensor in that it specifies an estimate of pressure at the latitude and longitude of the reference pressure sensor, but at a reference-level altitude that likely differs from the altitude of the reference pressure sensor. The reference-level pressure can be determined as follows:

$$P_{ref} = P_{sensor} \times \exp\left(-\frac{gM(h_{ref} - h_{sensor})}{RT_{remote}}\right), \quad \text{(Equation 2)}$$

where $P_{sensor}$ is the estimate of pressure at the location of the reference pressure sensor, $P_{ref}$ is the reference-level pressure estimate, and $h_{ref}$ is the reference-level altitude. The altitude of the mobile device $h_{mobile}$ can be determined using Equation 1, where $h_{ref}$ is substituted for $h_{sensor}$ and $P_{ref}$ is substituted for $P_{sensor}$. The reference-level altitude $h_{ref}$ may be any altitude and is often set at mean sea-level (MSL). When two or more reference-level pressure estimates are available, the reference-level pressure estimates are combined into a single reference-level pressure estimate value (e.g., using an average, weighted average, or other suitable combination of the reference pressures), and the single reference-level pressure estimate value is used for the reference-level pressure estimate $P_{ref}$.

The pressure sensor of the mobile device is typically inexpensive and susceptible to drift over time. Consequently, the pressure sensor must be frequently calibrated (e.g., hourly, daily, weekly, monthly or another time period). A typical approach for calibrating a pressure sensor determines a calibration adjustment (C) that, when applied to a measurement of pressure by the pressure sensor ($P_{mobile}$), results in an estimated altitude ($h_{mobile}$) that is within a tolerated amount of distance from the true altitude.

One approach to calibrate a pressure sensor in a mobile device is through the use of terrain height as the ground truth. This necessitates that phone data be collected over terrain and outside. Such a data collection depends on the user behavior (e.g., spending a lot of time indoors compared to outdoors), age, context (e.g., moving, still, walking, driving), and sloped versus flat terrain (e.g., where collection over flat terrain is preferred). Mobile device users will often spend most of their time inside, and mainly at their place of work (e.g., an office building) or at home with some commute between the two places. One of the factors impacting calibration quality is the number of data points used to estimate the calibration value. If a user spends most of his or her time indoors at an office, a home or other location that may have different floors at different altitudes or that may have a floor of unknown altitude, there is a limited amount of available data for when the user is outdoors, and using only that limited amount of data is likely to result in a poor quality calibration result. The quality of calibration can be improved if there is a methodology to utilize data collected indoors. Barometric pressure data collected by a pressure sensor of a mobile device while on one or more floors inside a building can be utilized if information about heights of the floors is available. Unfortunately, floor height data can be limited, which precludes mobile device calibration using pressure data that was collected while the mobile device was indoors. Although floor heights may be estimated using pressure differences between two or more floors that were measured by a mobile device over a short period of time during which pressure changes due to weather conditions can be ignored (e.g., pressure changes due to weather that are less than a threshold amount of change), the short time duration suggests limited opportunities to obtain quality data for calibration from indoor locations.

SUMMARY

In some embodiments, a method for estimating a floor height involves detecting that a mobile device is in a first area. Device pressure data measured by the mobile device when the mobile device is in the first area is collected. Reference pressure data is collected for when the mobile device was in the first area. The method further involves detecting that the mobile device is in a second area, where the second area is at least part of a floor of a building. Mobile device pressure data measured by the mobile device when the mobile device is in the second area is collected. Reference pressure data is collected for when the mobile device was in the second area. A first estimated altitude of the mobile device is determined, using one or more processors, using the mobile device pressure data and the reference pressure data from when the mobile device was detected to be in the first area. A second estimated altitude of the mobile device is determined, using one or more processors, using the mobile device pressure data and the reference pressure data from when the mobile device was detected to be in the second area. A difference in estimated altitude between the second estimated altitude of the mobile device and the first estimated altitude of the mobile device is determined using one or more processors. A first terrain altitude associated with the first area is determined. A second terrain altitude associated with the second area is determined. A difference in terrain altitude between the second terrain altitude associated with the second area and the first terrain altitude associated with the first area is determined using one or more processors. A height of the floor in the building at which the mobile device was located when in the second area using the difference in estimated altitude and the difference in terrain altitude is determined using one or more processors. The height of the floor is based on a difference between the difference in estimated altitude and the difference in terrain altitude.

In some embodiments, one or more non-transitory machine-readable media embody program instructions that, when executed by one or more machines, cause the one or more machines to implement a method for estimating a floor height that involves detecting that a mobile device is in a first area. Mobile device pressure data measured by the mobile device when the mobile device is in the first area is collected. Reference pressure data determined by one or more reference pressure sensors when the mobile device is in the first area is collected. The method further involves detecting that the mobile device is in a second area, where the second area is at least part of a floor of a building. Mobile device pressure data measured by the mobile device when the mobile device is in the second area is collected. Reference pressure data determined by one or more reference pressure sensors when the mobile device is in the second area is collected. A first estimated altitude of the mobile device using the mobile device pressure data and the reference pressure data from when the mobile device was detected to be in the first area is determined using one or more processors. A second estimated altitude of the mobile device using the mobile device pressure data and the reference pressure data from when the mobile device was detected to be in the second area is determined using one or more processors. A difference in estimated altitude between the second estimated altitude of the mobile device and the first estimated altitude of the mobile device is determined using one or more processors. A first terrain altitude associated with the first area is determined. A second terrain altitude associated with the second area is determined. A difference in terrain altitude between the second terrain altitude associated with the second area and the first terrain altitude associated with the first area is determined using one or more processors. A height of the floor in the building at which the mobile device was located when in the second area is determined, using one or more processors, using the difference in estimated altitude and the difference in terrain altitude, where the height of the floor is based on a difference between the difference in estimated altitude and the difference in terrain altitude.

In some embodiments, a system for estimating a floor height includes a pressure sensor and one or more machines that are coupled to the pressure sensor and configured to perform a method that involves detecting that a mobile device is in a first area. Mobile device pressure data measured by the mobile device when the mobile device is in the first area is collected. Reference pressure data determined by one or more reference pressure sensors when the mobile device is in the first area is collected. The method further involves detecting that the mobile device is in a second area, where the second area is at least part of a floor of a building. Mobile device pressure data measured by the mobile device when the mobile device is in the second area is collected. Reference pressure data determined by one or more reference pressure sensors when the mobile device is in the second area is collected. A first estimated altitude of the mobile device is determined, using one or more processors, using the mobile device pressure data and the reference pressure data from when the mobile device was detected to be in the first area. A second estimated altitude of the mobile device is determined, using one or more processors, using the mobile device pressure data and the reference pressure data from when the mobile device was detected to be in the second area. A difference in estimated altitude between the second estimated altitude of the mobile device and the first estimated altitude of the mobile device is determined using one or more processors. A first terrain altitude associated with the first area is determined. A second terrain altitude associated with the second area is determined. A difference in terrain altitude between the second terrain altitude associated with the second area and the first terrain altitude associated with the first area is determined using one or more processors. A height of the floor in the building at which the mobile device was located when in the second area is determined, using one or more processors, using the difference in estimated altitude and the difference in terrain altitude, where the height of the floor is based on a difference between the difference in estimated altitude and the difference in terrain altitude.

BRIEF DESCRIPTION OF THE DRAWINGS

FIG. 3 illustrates one example of a process for estimating a floor height in a building, which may be used to calibrate pressure measurements from a mobile device, in accordance with some embodiments.

FIG. 4 illustrates another example of a process for estimating a floor height in a building, which may be used to calibrate pressure measurements from a mobile device, in accordance with some embodiments.

DETAILED DESCRIPTION

Figure 1:
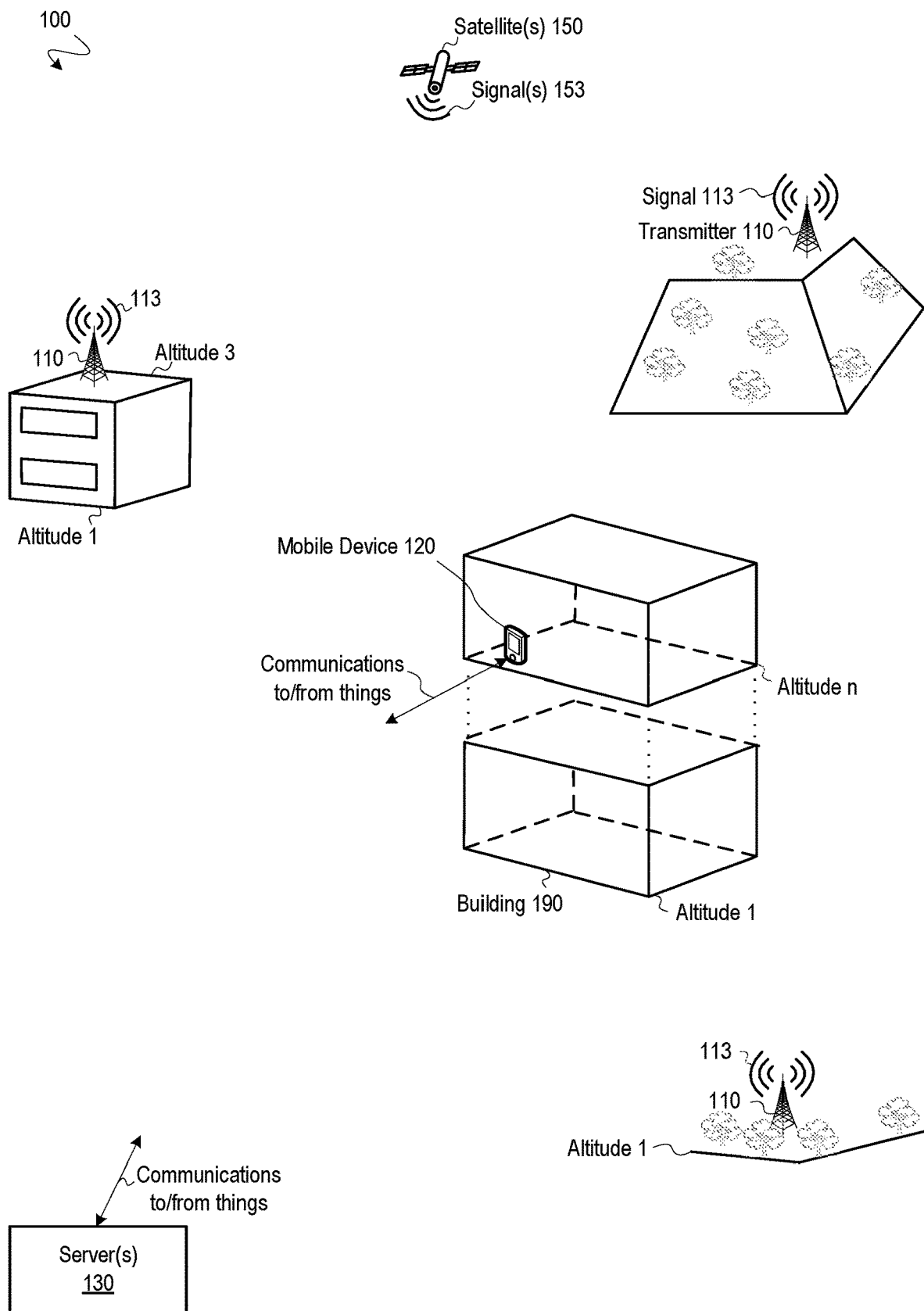
FIG. 1 depicts an operational environment in which systems and methods for calibration of a mobile device using floor height estimation may operate, in accordance with some embodiments.
Figure 5:
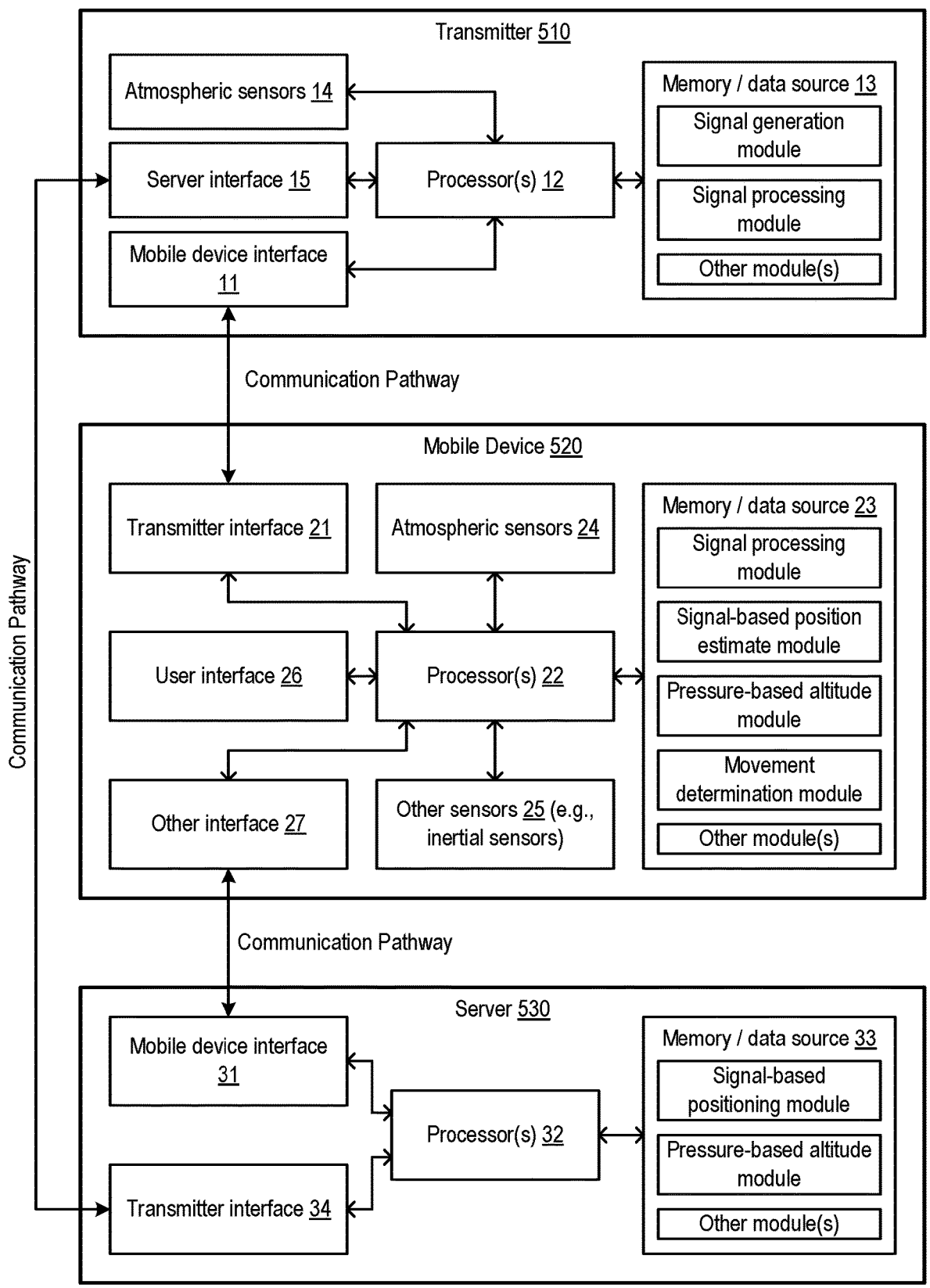
FIG. 5 illustrates components of a transmitter, a mobile device, and a server, in accordance with some embodiments.

New approaches to estimate floor height of buildings (e.g., high-rise or other types of buildings) for use in calibrating a pressure sensor of mobile device are disclosed herein, where such approaches can estimate floor heights during short or long time scales. Attention is initially drawn to an operational environment 100 illustrated in FIG. 1 in which systems and methods for estimating floor heights in a building (e.g., for use in calibrating a pressure sensor of mobile device) may operate. As shown in FIG. 1, the environment 100 includes a network of terrestrial transmitters 110, at least one mobile device 120, and a server 130. Each of the transmitters 110 and the mobile device 120 may be located at different altitudes or depths that are inside or outside various natural or manmade structures (e.g. buildings) 190. Positioning signals 113 and 153 are respectively transmitted from the transmitters 110 and satellites 150, and subsequently received by the mobile device 120 using known transmission technologies. For example, the transmitters 110 may transmit the signals 113 using one or more common multiplexing parameters that utilize time slots, pseudorandom sequences, frequency offsets, or other approaches, as is known in the art or otherwise disclosed herein. The mobile device 120 may take different forms, including a mobile phone or other wireless communication device, a portable computer, a navigation device, a tracking device, a receiver, or another suitable device that can receive the signals 113 and/or 153. Examples of possible components in the transmitters 110, the mobile device 120, and the server 130 are shown in FIG. 5. In particular, each transmitter 110 and mobile device 120 may include atmospheric sensors (e.g., a pressure and temperature sensors) for generating measurements of atmospheric conditions (e.g., pressure and temperature) that are used to estimate an unknown altitude of the mobile device 120. The pressure sensor of the mobile device 120 will drift over time, which requires calibration. Approaches for calibrating the pressure measurements of the pressure sensor are discussed below. One approach involves estimating height(s) of floor(s) in a building 190 on which the mobile device 120 was or is located, and then using those height(s) to calibrate the pressure sensor of the mobile device 120. This approach is discussed below with reference to FIG. 2. The process for determining a height of a floor need not always be performed in connection with calibrating the pressure sensor of the mobile device 120. In one embodiment, the process for determining a height of a floor is performed simply to determine the height of the floor. In another embodiment, the process for determining a height of a floor is performed to determine the height of the mobile device 120 above ground terrain, or to determine the altitude of the mobile device 120 (e.g., by adding the height to the altitude of the ground terrain).

Estimating Floor Heights in a Building (e.g., for Use in Calibrating a Pressure Sensor of Mobile Device)

Examples of conditions suitable for mobile device calibration are described in U.S. patent application Ser. No. 16/364,695, filed Mar. 6, 2019, entitled "Systems and Methods for Determining When to Calibrate a Pressure Sensor of a Mobile Device". The approaches described herein extend conditions for collecting data to times when a mobile device is indoors and above or below ground terrain. As a result, the approaches described herein generate more data for estimating floor heights, generate more data for calibrating a mobile device's pressure sensor, and overcome issues with the limited time duration imposed by pressure changes due to weather conditions over time that exceed a threshold amount of pressure change.

Approaches described herein use pressure data from a pressure sensor of a mobile device and pressure data from a reference network of pressure sensors (e.g., weather stations) along with user context and knowledge of a sensor drift time period to estimate a floor height. In some embodiments, estimation of a floor height translates indoor data (e.g., pressure data) to terrain-level data to thereby yield more data points for calibration. Approaches described herein may utilize the time history of user context and a reference pressure network to estimate floor height. The use of the reference pressure network allows for floor height determination using mobile device data collected over a few days or less. The duration of the mobile device data collection can be governed by a barometric sensor drift period (e.g., a number of days, weeks or months).

Preferable mobile device data for estimating a height of a floor and/or for calibration includes pressure data collected by a pressure sensor of the mobile device while outside over ground terrain (e.g., in a user's pocket, on a seat, or on a console of a car). Approaches described herein facilitate calibration of the mobile device's pressure sensor using data collected outside and also inside on a non-ground-level floor (e.g., from within a high-rise building or a building with subterranean floors). Any or all of three assumptions can be made for carrying out different approaches described herein. First, the building HVAC and stack effects on mobile device pressure measurements are minimal. Second, the mobile device pressure sensor drift is small (typically less than 10 Pa) over a few days (e.g., 2, 3, or 4 days, or another period of time). Third, behavior of the mobile device's user usually consists of less time spent outdoors on ground terrain than spent indoors. Approaches described herein provide useful results when collection of pressure data by the mobile device occurs outside over ground terrain and inside on building floors that are relatively flat (e.g., all mobile device movement in an area is within a threshold amount of vertical distance from each other, such as less than 1 m).

Figure 2:
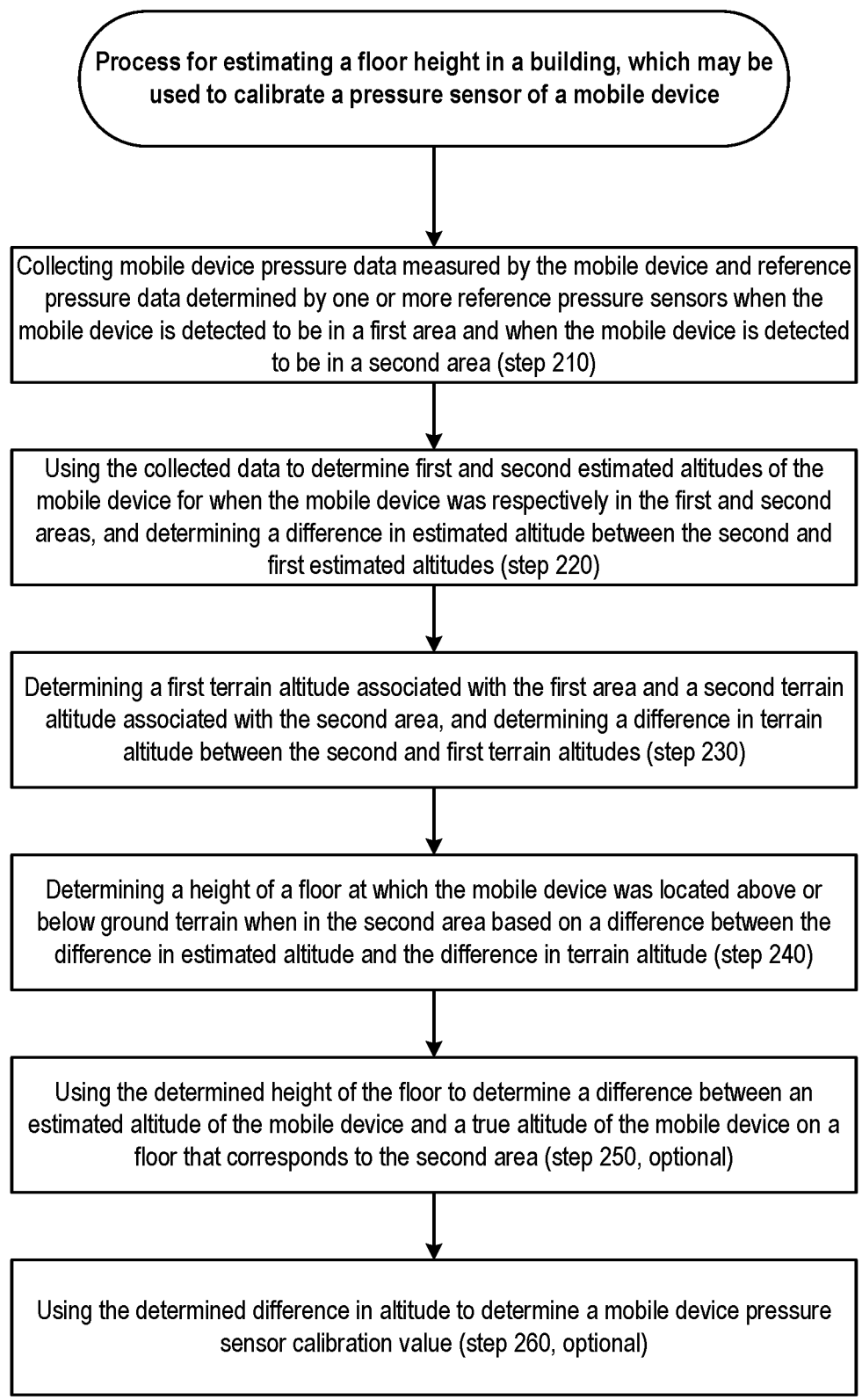
FIG. 2 depicts a process for estimating floor heights in a building, which may be used to calibrate pressure measurements from a mobile device, in accordance with some embodiments.

A process for estimating floor heights in a building, which may be used in calibrating a pressure sensor of mobile device is shown in FIG. 2. The particular steps, order of steps, and combination of steps are shown for illustrative and explanatory purposes only. Other embodiments can implement different particular steps, orders of steps, and combinations of steps to achieve similar functions or results. For purposes of illustration, FIG. 3 and FIG. 4 each show different embodiments of the process of FIG. 2. The process of FIG. 2 includes the following steps:

Step 210: collecting mobile device pressure data (e.g., pressure measurements) from a mobile device and reference pressure data (e.g., pressure measurements, or reference pressures for a reference altitude that are based on pressure measurements) from a reference pressure network during (i) a first time period t−n or t+n when the mobile device is detected to be in a first area (e.g., outside at a detectable altitude or height) and (ii) a second time period t when the mobile device is detected to be in a second area (e.g., in a building on a floor of an unknown altitude or height above or below ground terrain), where the first time period occurs before or after the second time period;

Step 220: using the data collected during the first time period to determine a first estimated altitude of the mobile device when the mobile device was detected to be in the first area, using the data collected during the second time period to determine a second estimated altitude of the mobile device when the mobile device was detected to be in the second area, and determining a difference in estimated altitude between the second and first estimated altitudes of the mobile;

Step 230: determining terrain altitudes (or heights relative to a reference altitude) associated with the locations of the mobile device during the first time period (e.g., the terrain of the first area) and the second time period (e.g., the terrain of the ground-level floor of the building in which the second area resides), and determining a difference in terrain altitude between the terrain altitude associated with the second area and the terrain altitude associated with the first area;

Step 240: determining a height of a floor at which the mobile device was located above or below ground when in the second area based on a difference between (i) the difference in estimated altitude and (ii) the difference in terrain altitude;

Step 250: using the determined height of the floor to determine a difference between an estimated altitude (or height relative to a reference altitude) of the mobile device and a true altitude (or height relative to the reference altitude) of the mobile device on the floor at which the mobile device was located when in the second area; and Step 260: using the determined difference in altitude (or height) to determine a mobile device pressure sensor calibration value.

Each of the above steps are discussed below. In some embodiments, such as when the height of the floor is desired without using the determined height for calibration, only step 210 through step 240 are performed. By way of example, one or more components for performing (e.g., that perform, or are configured, adapted or operable to perform) different steps of the process of FIG. 2 include: a pressure sensor of a mobile device (e.g., the mobile device 120) for collecting pressure data, an interface for receiving reference pressure data collected by reference pressure sensor(s) or for receiving reference pressure(s) associated with a reference altitude that were determined from reference pressure data collected by reference pressure sensor(s) (step 210); processor(s) to estimate altitudes and optionally determine a reference pressure to be used in estimating altitudes (step 220); communication interfaces to retrieve altitudes or heights of terrain, and processor(s) to estimate positions if used for identifying the terrain (step 230); processor(s) to determine the height of the floor (step 240); processor(s) to determine the difference between an estimated altitude of the mobile device and a true altitude of the mobile device on the floor (step 250); and processor(s) to determine a mobile device pressure sensor calibration value (step 260). Processor(s) can be at the mobile device 120 and/or another location (e.g., a server).

The first time period (t−n or t+n) refers to a time period during which pressure data is collected by a pressure sensor of a mobile device while in a first area (e.g., outside a building and usually held or stored 1-2 meters above the ground), and the second time period (t) refers to a time period during which pressure data is collected by a pressure sensor of a mobile device while in a second area (e.g., inside the building on a floor of the building and usually held or stored 1-2 meters above the floor). Reference pressure data from reference pressure sensors can be determined before, during or after the first and second time periods for use as described herein (e.g., to estimate respective altitudes of the mobile device during the first and second time periods). Determination prior to or after the respective time period is permitted under circumstances when pressure in the vicinity of the mobile device and/or reference sensor(s) is not changing more than a threshold amount of pressure (e.g., 10 Pa) over an amount of time between the determination of the reference pressure data and the respective time period. The value of n from t−n or t+n can be any number of time units (e.g., seconds, minutes, hours, and/or days), and relates to an amount of time needed for a user to transition from the first area to the second area or vice versa (e.g., less than an hour), but can be longer (e.g., more than two hours, or greater than a day). The term n is mainly used herein to designate relative time periods (i.e., before/after time periods). The times t, t−n and t+n are times during which a mobile device is believed to be within a particular area, which can be determined by detecting different contexts (e.g., being outside after detecting a transition from riding transportation to walking, being at a floor of a building after detecting vertical movement associated with an elevator, being in an outside or inside area identified by an estimated 2D or 3D position of the mobile device, having limited movement during certain hours of a day associated with an activity like being at a user's work or home, being anywhere and detecting a transition from no movement to walking or being on-foot and vice versa, or other contexts known in the art).

During step 210, pressure data is collected from a pressure sensor of the mobile device and from one or more reference sensors for when the mobile device is detected to be in a first area at a first time period and for when the mobile device is detected to be in a second area at a second time period. The pressure data includes mobile device pressure data (e.g., pressure measurements) from the mobile device and reference pressure data (e.g., one or more pressure measurements, or one or more reference pressures for a reference altitude that are based on one or more pressure measurements) from one or more reference sensors. The reference pressure data for when the mobile device is detected to be in an area can include or be based on pressure measurements from reference pressure sensor(s) that were measured before, during or after the mobile device was detected to be in the area (e.g., within a tolerated amount of time before or after the detection, for example less than an hour or 15 minutes, or within an amount of time before or after the detection during which a change in pressure within the environment around the mobile device and/or reference pressure sensor(s) remains within a threshold amount of pressure, for example 10 Pa). For purpose of illustration, suppose a mobile device user commutes to work, parks his or her car or exits public transportation, and walks to an office location inside a building from the parking lot or public transportation stop. The walk to the office may happen on flat or sloped terrain. During this time, a detected user context of transportation to still ("TS") followed by a detected context of still to on-foot ("SF") or still to walk ("SW") occurs at time t−n outside over flat or sloped terrain, which indicates the mobile device is outside in a first area. At the office, at a later time t where t>t−n, the mobile device is on a floor of a building (e.g., an upper floor of a high-rise building) where detection of different user contexts can include one or more still to on-foot (SF) or still to walk (SW) transitions arising from walking activity between an office desk of the user and other parts of the office. These contexts may be detected after detection of a vertical movement ("V") context associated with elevator transport of the mobile device. Over the course of a few days, several sets of pressure data can be accumulated where each set of data is composed of a few TS and SF/SW context pairs outside on terrain and several SF/SW context transitions (optionally after a V context) indoors. It is noted that one may use the data collected outside over terrain (e.g., only TS/SF context pairs) for calibration purposes in some implementations. However, limited numbers of data points will yield a less stable calibration value. The stability of calibration is improved by including pressure data from indoors, which addresses the lack of outdoor pressure data for calibration that may arise due to no or relatively little outside activity of a user over a few days as compared to inside activity of a user (e.g., user stays indoors most of all the time over the few days). FIG. 3 depicts a schematic that shows user/mobile device locations at different time periods (e.g., times t–n and t). The mobile device 120 is located at a first area outside over terrain at time t–n and at a second area on a floor of the building 190 at time t. Different relationships between estimated altitudes of the mobile device 120 and terrain heights associated with different locations of the mobile device 120 are shown as six example scenarios 302a-f, which will be further understood in relation to steps 220, 230 and 240 discussed below.

During step 220, mobile device pressure data collected during the first time period (e.g., t–n) when the mobile device 120 is in the first area and the second time period (e.g., t) when the mobile device is in the second area is combined with reference pressure data to respectively estimate first and second altitudes of the mobile device 120 during the first time period while in the first area and the second time period while in the second area—e.g., using Equation 1, where the data collected for the first time period is used to estimate an altitude for the first area, and the data collected for the second time period is used to estimate an altitude for the second area. As stated previously, the reference pressure data may be one or more reference pressures, which may be combined (e.g., averaged) to determine a singular reference pressure for use in Equation 1. A difference in estimated altitude between the second estimated altitude of the mobile device 120 when it was in the second area and the first estimated altitude of the mobile device 120 when it was in the first area (Zp) is determined as:

$$Zp=Pz(t)-Pz(t-n) \quad \text{(Equation 3)},$$

where Pz(t–n) is the first estimated altitude of the mobile altitude when in the first area (e.g., outside) and Pz(t) is the second estimated altitude of the mobile altitude when in the second area (e.g., inside on the floor of the building 190). In an alternative embodiment, Zp is the absolute value of the difference in estimated altitude.

During step 230, a difference in terrain altitude (or height relative to a reference altitude) between terrain altitudes associated with the second area and the first area is determined using:

$$Zt=Tz(t)-Tz(t-n) \quad \text{(Equation 4)},$$

where Tz(t–n) is a first terrain altitude of the terrain in the first area, and Tz(t) is a second terrain altitude of a ground-level floor of the building in which the second area is located. In the alternative embodiment described in the preceding paragraph, Zt is the absolute value of the difference in terrain altitude. By way of example, terrain altitudes (or heights) can be looked up from a terrain database using an estimated latitude and longitude of the mobile device for the first time period (e.g., t–n) and the second time period (e.g., t). The terrain altitude (or height) of the building can alternatively be looked up when entry of the mobile device 120 into the building is detected using known means of detection. If height relative to a reference altitude is looked up, then the terrain altitude is the combination of that height and the reference altitude (e.g., sum of the two numbers).

During step 240, a height of the floor at which the mobile device 120 resided while in the second area during the second time period (e.g., t) (Fh) is determined. There are different ways by which the floor height can be determined. In a first approach for determining floor height, a difference between the difference in estimated altitude from step 220 (Zp) and the difference in terrain altitude from step 230 (Zt) is used to determine the height of the floor at which the mobile device 120 resided while in the second area during the second time period (e.g., t) (Fh):

$$Fh=Zp-Zt \quad \text{(Equation 5)}.$$

In the alternative embodiment described in the preceding paragraph, the floor height is the absolute value of the difference between the difference in estimated altitude from step 220 (Zp) and the difference in terrain altitude from step 230 (Zt). In circumstances that use known methods for determining or assuming the height above the floor at which the mobile device is positioned when the second estimated altitude of the mobile device 120 is determined, that height above the floor can be subtracted from the difference between the difference in estimated altitude from step 220 (Zp) and the difference in terrain altitude from step 230 (Zt) to yield Fh. Thus, Fh is based on the difference between the difference in estimated altitude from step 220 (Zp) and the difference in terrain altitude from step 230 (Zt) in that it can be the difference or the difference adjusted by another value (e.g., the height at which the mobile device is position above the floor). It is noted that the second area may be above or below the ground-level terrain of the building in different embodiments. The first approach can be advantageously used when data from a weather station network is available and allows for pressure changes due to weather variation between measurements of pressure. In a second approach, floor height (Fh) is determined from storage (e.g., a building database that stores floor heights in association with access points that detect the mobile device or are detected by the mobile device), which advantageously is not impacted by weather effects on pressure. In a third approach, floor height (Fh) is determined from a pressure difference between the ground and floor of the building by converting the pressure difference to a height measurement, which can be advantageously used during times when the weather is stable and pressure variation is small over time (e.g., less than 10 Pa per a predetermined number of time units such as a few minutes or the amount of time between the two pressure measurements) and/or during short weather station network outages. Over time, when phone data is available across different floors of a building under varying weather conditions, the first approach offers a robust way to determine building floor heights in a scalable way. In contrast, the second approach requires access to instrumentation (e.g., access points) to detect presence on particular floors (e.g., every floor) of a building and necessitates populating and maintaining databases with floor information. On the other hand, the third approach is applicable over short periods of time and thereby limits data availability for calibration.

During step 250, the height of the floor (Fh) is used to determine a difference in altitude (dz) between an estimated altitude (or height) of the mobile device and an altitude (or height) of the mobile device on the floor at which the mobile device was located during the second time period (e.g., t):

$$dz = Pz(t) - (Tz(t) + Fh) \quad \text{(Equation 6)},$$

where Tz(t) is the terrain altitude of the building within which the mobile device resides in the second area (e.g., on the floor) during the second time period (e.g., t), and Pz(t) is the estimated altitude of the mobile altitude in the second area (e.g., on the floor) during the second time period (e.g., t). If a height relative to a reference altitude is looked up, then Tz(t) is the combination of that height and the reference altitude (e.g., a sum of the two numbers).

During step 260, a mobile device pressure sensor calibration value (dp) that represents the difference between true pressure and measured pressure, is determined using the difference in height (dz) and other information. By way of example, the following hydrostatic equation may be used to determine the mobile device pressure sensor calibration value (dp):

$$dp = -[p/(R \times Tv)] \times g \times dz \quad \text{(Equation 7)},$$

where p is a measurement of pressure or a combination (e.g., average) of pressure measurements from the pressure sensor of the mobile device 120 when the mobile device 120 is in the second area during some period of time (e.g., t or other time period(s)), dz is the difference in height given by Equation 6, g is a value of acceleration due to gravity, R is a value of a dry air gas constant (287 J/kg K), and Tv is temperature value such as the virtual temperature of moist air defined by T(1+0.608×q) where T is the temperature of air and q is the mixing ratio (a measure of vapor content expressed in kg/kg). The hydrostatic equation represents a balance between the force of gravity and a vertical pressure gradient force. The balance is represented in general as:

$$dp = Q \times g \times dz \quad \text{(Equation 8)},$$

where Q relates to the density of air, dz relates to thickness of an air layer and dp relates to pressure thickness of air. One form of the ideal gas law is shown below:

$$p = Q \times R \times Tv \quad \text{(Equation 9)},$$

which can be rearranged as follows:

$$Q = p/(R \times Tv) \quad \text{(Equation 10)}$$

to obtain Equation 7.

In a first set of embodiments, the first time period (t−n or t+n) and the second time period (t) are singular time periods during which a mobile device collects pressure data for use in determining the height of a floor in a building. By way of example, an embodiment from the first set of embodiments may collect pressure data on a first day during the first time period when the mobile device is in the first area and during the second time period when the mobile device is in the second area, and then use that data to determine the height of the floor in the building as described herein (e.g., use that data to estimate respective altitudes of the mobile device's position when the mobile device is in the first area and when the mobile device is in the second area, and perform other steps). The collected data during the singular time periods may be a single data point (e.g., a single pressure measurement from the mobile device) used to estimate an altitude, or a plurality of data points that are mathematically combined (e.g., averaged) before being used to estimate an altitude or that are used to estimate altitudes that are mathematically combined (e.g., averaged) into a single estimated altitude.

In a second set of embodiments, the first time period and the second time period refer to first and second sets of singular time periods during which a mobile device collects pressure data for use in determining the height of a floor in a building. By way of example, an embodiment from the second set of embodiments may collect pressure data on different days when the mobile device 120 is in the first area and collect pressure data on those days when the mobile device 120 is in the second area, and then use that data to determine the height of the floor in the building 190 as described herein (e.g., estimate different altitudes of the mobile device's position when the mobile device 120 is in the first area on different days and mathematically combine the estimated altitudes to determine a final altitude associated with the first area, and estimate different altitudes of the mobile device's position when the mobile device 120 is in the second area on different days and mathematically combine the estimated altitudes to determine a final altitude associated with the second area, where the mathematical combinations could be averaging or another form of combination). By way of example, FIG. 4 depicts a schematic showing different days for collecting and using pressure data when the mobile device is detected to be in the first area and detected to be in the second area. The times during which the mobile device is detected to be in the first area may differ each day and can include times before and after the mobile device is detected to be in the second area. The times during which the mobile device is detected to be in the second area may also differ each day. As shown in FIG. 4, associated steps may include: combining (e.g., averaging) $1^{st}$ through $N^{th}$ estimated altitudes of the mobile device while in the first area to determine an Estimated Altitude at First Area value; combining (e.g., averaging) 1st through $N^{th}$ estimated altitudes of the mobile device while in the second area to determine an Estimated Altitude at Second Area value, and determining the difference in estimated altitude (Zp) as the difference between the Estimated Altitude at Second Area value and the Estimated Altitude at First Area value.

Technical Benefits

Mobile devices are routinely used to estimate positions of their users in different environments. Examples of estimated positions include estimated altitudes of mobile devices that are based on (i) reference pressures from a network of reference pressure sensors and (ii) measurements of pressure from pressure sensors of the mobile devices. Unfortunately, limitations in the functionality of the pressure sensor of the mobile device can impact the accuracy of estimated altitudes, which impairs different uses of the estimated altitudes emergency response, navigation, etc.). Such functional limitations of the pressure sensors include sensor drift over time that must be calibrated. Improvements to the functionality of pressure sensors in the mobile devices in support of better more reliable, accurate and/or available) altitude estimates is highly desirable, and the processes described herein include unconventional, concrete and particular solutions that are specifically designed to achieve improvements in the functionality of the pressure sensors in the mobile devices, which allow for better altitude estimates.

Compared to previous approaches, performance of processes described herein provide for improved uses of estimated altitudes of mobile devices for determining heights of floors, which is highly useful for detecting a floor on which a mobile device resides by matching an estimated height with a stored floor height of a floor that is associated with a floor number. The floor number can then be used by emergency response personnel to more-quickly locate the user of the mobile device, or for other applications like navigation.

Other Aspects

Approaches for estimating floor height described herein can be used to determine a difference in height between the office floor and another floor where contexts corresponding to the office floor and another floor are used in a similar way as contexts corresponding to the office floor and outdoor terrain (e.g., contexts for the other floor are used in place of contexts for the outdoor terrain, and where the altitude of the other floor is known (e.g., ground floor of the building or other floor).

Any method (also referred to as a "process" or an "approach") described or otherwise enabled by disclosure herein may be implemented by hardware components (e.g., machines), software modules (e.g., stored in machine-readable media), or a combination thereof. In particular, any method described or otherwise enabled by disclosure herein may be implemented by any concrete and tangible system described herein. By way of example, machines may include one or more computing device(s), processor(s), controller(s), integrated circuit(s), chip(s), system(s) on a chip, server(s), programmable logic device(s), field programmable gate array(s), electronic device(s), special purpose circuitry, and/or other suitable device(s) described herein or otherwise known in the art. One or more non-transitory machine-readable media embodying program instructions that, when executed by one or more machines, cause the one or more machines to perform or implement operations comprising the steps of any of the methods described herein are contemplated herein. As used herein, machine-readable media includes all forms of machine-readable media, including but not limited to one or more non-volatile or volatile storage media, removable or non-removable media, integrated circuit media, magnetic storage media, optical storage media, or any other storage media, including RAM, ROM, and EEPROM, that may be patented under the laws of the jurisdiction in which this application is filed, but does not include machine-readable media that cannot be patented under the laws of the jurisdiction in which this application is filed (e.g., transitory propagating signals). Methods disclosed herein provide sets of rules that are performed. Systems that include one or more machines and one or more non-transitory machine-readable media for implementing any method described herein are also contemplated herein. One or more machines that perform or implement, or are configured, operable or adapted to perform or implement operations comprising the steps of any methods described herein are also contemplated herein. Each method described herein that is not prior art represents a specific set of rules in a process flow that provides significant advantages in the field of calibration of a mobile device using floor height estimation. Method steps described herein may be order independent and can be performed in parallel or in an order different from that described if possible to do so. Different method steps described herein can be combined to form any number of methods, as would be understood by one of ordinary skill in the art. Any method step or feature disclosed herein may be omitted from a claim for any reason. Certain well-known structures and device are not shown in figures to avoid obscuring the concepts of the present disclosure. When two things are "coupled to" each other, those two things may be directly connected together, or separated by one or more intervening things. Where no lines or intervening things connect two particular things, coupling of those things is contemplated in at least one embodiment unless otherwise stated. Where an output of one thing and an input of another thing are coupled to each other, information sent from the output is received in its outputted form or a modified version thereof by the input even if the information passes through one or more intermediate things. Any known communication pathways and protocols may be used to transmit information (e.g., data, commands, signals, bits, symbols, chips, and the like) disclosed herein unless otherwise stated. The words comprise, comprising, include, including and the like are to be construed in an inclusive sense (i.e., not limited to) as opposed to an exclusive sense (i.e., consisting only of). Words using the singular or plural number also include the plural or singular number, respectively, unless otherwise stated. The word "or" and the word "and" as used in the Detailed Description cover any of the items and all of the items in a list unless otherwise stated. The words some, any and at least one refer to one or more. The terms may or can are used herein to indicate an example, not a requirement—e.g., a thing that may or can perform an operation, or may or can have a characteristic, need not perform that operation or have that characteristic in each embodiment, but that thing performs that operation or has that characteristic in at least one embodiment. Unless an alternative approach is described, access to data from a source of data may be achieved using known techniques (e.g., requesting component requests the data from the source via a query or other known approach, the source searches for and locates the data, and the source collects and transmits the data to the requesting component, or other known techniques). The mobile device may take different forms, including a mobile phone or other wireless communication device, a portable calculator, a navigation device, a tracking device, a receiver, or another suitable device. The term "handset" is used to refer to a "mobile device".

FIG. 5 illustrates components of a transmitter 510, a mobile device 520, and a server 530. Examples of communication pathways are shown by arrows between components.

By way of example in FIG. 5, each of the transmitters 510 may include: a mobile device interface 11 for exchanging information with a mobile device (e.g., antenna(s) and RF front end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, humidity, other) at or near the transmitter, including of a reference pressure sensor; a server interface 15 for exchanging information with a server (e.g., an antenna, a network interface, or other); and any other components known to one of ordinary skill in the art. The memory/data source 13 may include memory storing software modules with executable instructions, and the processor(s) 12 may perform different actions by executing the instructions from the modules, including: (i) performance of part or all of Approaches described herein as described herein or otherwise understood by one of skill in the art as being performable at the transmitter; (ii) generation of positioning signals for transmission using a selected time, frequency, code, and/or phase; (iii) processing of signaling received from the mobile device or other source; or (iv) other processing as required by operations described in this disclosure. Signals generated and transmitted by a transmitter may carry different information that, once determined by a mobile device or a server, may identify the following: the transmitter; the transmitter's position; environmental conditions at or near the transmitter; and/or other information known in the art. The atmospheric sensor(s) 14 may be integral with the transmitter, or separate from the transmitter and either co-located with the transmitter or located in the vicinity of the transmitter (e.g., within a threshold amount of distance).

By way of example FIG. 5, the mobile device 520 may include: a transmitter interface 21 for exchanging information with a transmitter (e.g., an antenna and RF front end components known in the art or otherwise disclosed herein); one or more processor(s) 22; memory/data source 23 for providing storage and retrieval of information and/or program instructions; atmospheric sensor(s) 24 for measuring environmental conditions (e.g., pressure, temperature, other) at the mobile device, including a pressure sensor; other sensor(s) 25 for measuring other conditions (e.g., inertial sensors for measuring movement and orientation); a user interface 26 (e.g., display, keyboard, microphone, speaker, other) for permitting a user to provide inputs and receive outputs; another interface 27 for exchanging information with the server or other devices external to the mobile device (e.g., an antenna, a network interface, or other); and any other components known to one of ordinary skill in the art. A GNSS interface and processing unit (not shown) are contemplated, which may be integrated with other components (e.g., the interface 21 and the processors 22) or a standalone antenna, RF front end, and processors dedicated to receiving and processing GNSS signaling. The memory/data source 23 may include memory storing software modules with executable instructions, and the processor(s) 22 may perform different actions by executing the instructions from the modules, including: (i) performance of part or all of Approaches described herein as described herein or otherwise understood by one of ordinary skill in the art as being performable at the mobile device; (ii) estimation of an altitude of the mobile device based on measurements of pressure from the mobile device and transmitter(s), temperature measurement(s) from the transmitter(s) or another source, and any other information needed for the computation); (iii) processing of received signals to determine position information (e.g., times of arrival or travel time of the signals, pseudoranges between the mobile device and transmitters, transmitter atmospheric conditions, transmitter and/or locations or other transmitter information); (iv) use of position information to determine an estimated position of the mobile device; (v) determination of movement based on measurements from inertial sensors of the mobile device; (vi) GNSS signal processing; or (vii) other processing as required by operations described in this disclosure.

By way of example FIG. 5, the server 530 may include: a mobile device interface 31 for exchanging information with a mobile device (e.g., an antenna, a network interface, or other); one or more processor(s) 32; memory/data source 33 for providing storage and retrieval of information and/or program instructions; a transmitter interface 34 for exchanging information with a transmitter (e.g., an antenna, a network interface, or other); and any other components known to one of ordinary skill in the art. The memory/data source 33 may include memory storing software modules with executable instructions, and the processor(s) 32 may perform different actions by executing instructions from the modules, including: (i) performance of part or all of Approaches described herein as described herein or otherwise understood by one of ordinary skill in the art as being performable at the server; (ii) estimation of an altitude of the mobile device; (iii) computation of an estimated position of the mobile device; or (iv) other processing as required by operations described in this disclosure. Steps performed by servers as described herein may also be performed on other machines that are remote from a mobile device, including computers of enterprises or any other suitable machine.

Certain aspects disclosed herein may relate to estimating the positions of mobile devices—e.g., where the position is represented in terms of: latitude, longitude, and/or altitude coordinates; x, y, and/or z coordinates; angular coordinates; or other representations. Various techniques to estimate the position of a mobile device can be used, including trilateration, which is the process of using geometry to estimate the position of a mobile device using distances traveled by different "positioning" (or "ranging") signals that are received by the mobile device from different beacons (e.g., terrestrial transmitters and/or satellites). If position information like the transmission time and reception time of a positioning signal from a beacon are known, then the difference between those times multiplied by speed of light would provide an estimate of the distance traveled by that positioning signal from that beacon to the mobile device. Different estimated distances corresponding to different positioning signals from different beacons can be used along with position information like the locations of those beacons to estimate the position of the mobile device. Positioning systems and methods that estimate a position of a mobile device (in terms of latitude, longitude and/or altitude) based on positioning signals from beacons (e.g., transmitters, and/or satellites) and/or atmospheric measurements are described in co-assigned U.S. Pat. No. 8,130,141, issued Mar. 6, 2012, and U.S. Pat. Pub. No. 2012/0182180, published Jul. 19, 2012. It is noted that the term "positioning system" may refer to satellite systems (e.g., Global Navigation Satellite Systems (GNSS) like GPS, GLONASS, Galileo, and Compass/Beidou), terrestrial transmitter systems, and hybrid satellite/terrestrial systems.

What is claimed is:

1. A method, comprising:
   detecting that a mobile device is in a first area;
   determining, using one or more processors, a first estimated altitude of the mobile device when the mobile device was detected to be in the first area;
   detecting that the mobile device is in a second area, wherein the second area is at least part of a floor of a building;
   determining, using the one or more processors, a second estimated altitude of the mobile device when the mobile device was detected to be in the second area;
   determining, using the one or more processors, a difference in estimated altitude between the second estimated altitude of the mobile device and the first estimated altitude of the mobile device;
   determining, using the one or more processors, a first terrain altitude of a first terrain that is associated with the first area;
   determining, using the one or more processors, a second terrain altitude of a second terrain that is associated with the second area;
   determining, using the one or more processors, a difference in terrain altitude between the second terrain altitude associated with the second area and the first terrain altitude associated with the first area; and
   determining, using the one or more processors, a height of the floor in the building at which the mobile device was located when in the second area using the difference in estimated altitude and the difference in terrain altitude, wherein the height of the floor is based on a difference between i) the difference in estimated altitude and ii) the difference in terrain altitude.

2. The method of claim 1, wherein the method further comprises:
using the height of the floor to determine a difference in altitude between i) an estimated altitude of the mobile device when on the floor of the building, and ii) a true altitude of the mobile device when on the floor of the building; and
using the difference in altitude to determine a mobile device pressure sensor calibration value for calibrating a pressure sensor of the mobile device.

3. The method of claim 2, wherein using the height of the floor to determine a difference in altitude between i) an estimated altitude of the mobile device when on the floor of the building, and ii) a true altitude of the mobile device when on the floor of the building comprises:
reducing the second estimated altitude by the second terrain altitude and by the height of the floor; and
using the result of reducing the second estimated altitude by the second terrain altitude and by the height of the floor as the difference in altitude.

4. The method of claim 2, wherein using the difference in altitude to determine a mobile device pressure sensor calibration value comprises:
determining the mobile device pressure sensor calibration value by (i) dividing a measurement of pressure from the pressure sensor of the mobile device or a combination of pressure measurements by the pressure sensor taken while the mobile device was in the second area by a product of an air gas constant and a temperature value, and (ii) multiplying the result thereof by the difference in altitude and by an amount of acceleration due to gravity.

5. The method of claim 1, further comprising:
collecting first mobile device pressure data measured by a pressure sensor of the mobile device when the mobile device is in the first area;
collecting first reference pressure data for when the mobile device was in the first area;
collecting second mobile device pressure data measured by the pressure sensor of the mobile device when the mobile device is in the second area; and
collecting second reference pressure data for when the mobile device was in the second area;
wherein:
determining the first estimated altitude comprises determining, using the one or more processors, the first estimated altitude using the first mobile device pressure data and the first reference pressure data; and
determining the second estimated altitude comprises determining, using the one or more processors, the second estimated altitude using the second mobile device pressure data and the second reference pressure data.

6. The method of claim 5, wherein:
collecting the first mobile device pressure data comprises determining at least one measurement of pressure in the first area on a first day; and
collecting the second mobile device pressure data comprises determining at least one measurement of pressure in the second area on the first day.

7. The method of claim 5, wherein:
collecting the first mobile device pressure data comprises collecting a first set of measurements of pressure in the first area on different days, wherein the first set of measurements of pressure collected on different days are used to determine the first estimated altitude; and
collecting the second mobile device pressure data comprises collecting a second set of measurements of pressure in the second area on different days, wherein the second set of measurements of pressure collected on different days are used to determine the second estimated altitude.

8. The method of claim 1, wherein:
the first terrain altitude associated with the first area is an altitude of the first terrain at the first area, the first area being outside; and
the second terrain altitude associated with the second area is an altitude of the second terrain, the second terrain being a ground-level terrain under the second area.

9. One or more non-transitory machine-readable media embodying program instructions that, when executed by one or more machines, cause the one or more machines to implement a method, comprising:
detecting that a mobile device is in a first area;
determining, using one or more processors, a first estimated altitude of the mobile device when the mobile device was detected to be in the first area;
detecting that the mobile device is in a second area, wherein the second area is at least part of a floor of a building;
determining, using the one or more processors, a second estimated altitude of the mobile device when the mobile device was detected to be in the second area;
determining, using the one or more processors, a difference in estimated altitude between the second estimated altitude of the mobile device and the first estimated altitude of the mobile device;
determining a first terrain altitude of a first terrain that is associated with the first area;
determining a second terrain altitude of a second terrain that is associated with the second area;
determining, using the one or more processors, a difference in terrain altitude between the second terrain altitude associated with the second area and the first terrain altitude associated with the first area; and
determining, using the one or more processors, a height of the floor in the building at which the mobile device was located when in the second area using the difference in estimated altitude and the difference in terrain altitude, wherein the height of the floor is based on a difference between i) the difference in estimated altitude, and ii) the difference in terrain altitude.

10. The non-transitory machine-readable media of claim 9, wherein the method further comprises:
using the height of the floor to determine a difference in altitude between i) an estimated altitude of the mobile device when on the floor of the building, and ii) a true altitude of the mobile device when on the floor of the building; and
using the difference in altitude to determine a mobile device pressure sensor calibration value for calibrating a pressure sensor of the mobile device.

11. The non-transitory machine-readable media of claim 10, wherein using the height of the floor to determine a difference in altitude between an estimated altitude of the mobile device when on the floor of the building and a true altitude of the mobile device when on the floor of the building comprises:
reducing the second estimated altitude by the second terrain altitude and by the height of the floor; and
using the result of reducing the second estimated altitude by the second terrain altitude and by the height of the floor as the difference in altitude.

12. The non-transitory machine-readable media of claim 10, wherein using the difference in altitude to determine a mobile device pressure sensor calibration value comprises:
  determining the mobile device pressure sensor calibration value by (i) dividing a measurement of pressure from the pressure sensor of the mobile device or a combination of pressure measurements by the pressure sensor taken while the mobile device was in the second area by a product of an air gas constant and a temperature value, and (ii) multiplying the result thereof by the difference in altitude and by an amount of acceleration due to gravity.

13. The non-transitory machine-readable media of claim 9, wherein the method further comprises:
  collecting first mobile device pressure data measured by a pressure sensor of the mobile device when the mobile device is in the first area;
  collecting first reference pressure data for when the mobile device was in the first area;
  collecting second mobile device pressure data measured by the pressure sensor of the mobile device when the mobile device is in the second area; and
  collecting second reference pressure data for when the mobile device was in the second area;
  wherein:
  determining the first estimated altitude comprises determining, using the one or more processors, the first estimated altitude of the mobile device using the first mobile device pressure data and the first reference pressure data; and
  determining the second estimated altitude comprises determining, using the one or more processors, the second estimated altitude of the mobile device using the second mobile device pressure data and the second reference pressure data.

14. A system, comprising:
  a pressure sensor of a mobile device; and
  one or more machines that are coupled to the pressure sensor and configured to perform a method comprising:
  detecting that the mobile device is in a first area;
  determining, using one or more processors, a first estimated altitude of the mobile device when the mobile device was detected to be in the first area;
  detecting that the mobile device is in a second area, wherein the second area is at least part of a floor of a building;
  determining, using the one or more processors, a second estimated altitude of the mobile device when the mobile device was detected to be in the second area;
  determining, using the one or more processors, a difference in estimated altitude between the second estimated altitude of the mobile device and the first estimated altitude of the mobile device;
  determining a first terrain altitude of a first terrain that is associated with the first area;
  determining a second terrain altitude of a second terrain that is associated with the second area;
  determining, using the one or more processors, a difference in terrain altitude between the second terrain altitude associated with the second area and the first terrain altitude associated with the first area;
  determining, using the one or more processors, a height of the floor in the building at which the mobile device was located when in the second area using the difference in estimated altitude and the difference in terrain altitude, wherein the height of the floor is based on a difference between i) the difference in estimated altitude, and ii) the difference in terrain altitude;
  using the height of the floor to determine a difference in altitude between an estimated altitude of the mobile device when on the floor of the building and a true altitude of the mobile device when on the floor of the building; and
  using the difference in altitude to determine a mobile device pressure sensor calibration value for calibrating the pressure sensor.

15. The system of claim 14, wherein the method further comprises:
  collecting first mobile device pressure data measured by the mobile device when the mobile device is in the first area;
  collecting first reference pressure data for when the mobile device was in the first area;
  collecting second mobile device pressure data measured by the mobile device when the mobile device is in the second area; and
  collecting second reference pressure data for when the mobile device was in the second area;
  wherein:
  determining the first estimated altitude comprises determining, using the one or more processors, the first estimated altitude using the first mobile device pressure data and the first reference pressure data; and
  determining the second estimated altitude comprises determining, using the one or more processors, the second estimated altitude using the second mobile device pressure data and the second reference pressure data.

16. The system of claim 15, wherein:
  collecting the first mobile device pressure data comprises determining at least one measurement of pressure in the first area on a first day; and
  collecting the second mobile device pressure data comprises determining at least one measurement of pressure in the second area on the first day.

17. The system of claim 15, wherein:
  collecting the first mobile device pressure data comprises collecting a first set of measurements of pressure in the first area on different days, wherein the first set of measurements of pressure collected on different days are used to determine the first estimated altitude; and
  collecting the second mobile device pressure data comprises collecting a second set of measurements of pressure in the second area on different days, wherein the second set of measurements of pressure collected on different days are used to determine the second estimated altitude.

18. The system of claim 14, wherein using the height of the floor to determine a difference in altitude between an estimated altitude of the mobile device when on the floor of the building and a true altitude of the mobile device when on the floor of the building comprises:
  reducing the second estimated altitude by the second terrain altitude and by the height of the floor; and
  using the result of reducing the second estimated altitude by the second terrain altitude and by the height of the floor as the difference in altitude.

19. The system of claim 14, wherein using the difference in altitude to determine a mobile device pressure sensor calibration value comprises:
  determining the mobile device pressure sensor calibration value by (i) dividing a measurement of pressure from the pressure sensor of the mobile device or a combination of pressure measurements by the pressure sensor taken while the mobile device was in the second area by a product of an air gas constant and a temperature value, and (ii) multiplying the result thereof by the difference in altitude and by an amount of acceleration due to gravity.

20. The system of claim 14, wherein:
the first terrain altitude associated with the first area is an altitude of the first terrain at the first area, the first area being outside; and
the second terrain altitude associated with the second area is an altitude of the second terrain, the second terrain being a ground-level terrain under the second area.

\* \* \* \* \*